US006438223B1

(12) United States Patent
Eskafi et al.

(10) Patent No.: US 6,438,223 B1
(45) Date of Patent: Aug. 20, 2002

(54) SYSTEM AND METHOD FOR LOCAL NUMBER PORTABILITY FOR TELECOMMUNICATION NETWORKS

(75) Inventors: Farokh H. Eskafi; Mohammad D. Kazerouni, both of Berkeley, CA (US)

(73) Assignee: Open Telephone Network, Inc., Berkeley, CA (US)

( * ) Notice: Subject to any disclaimer, the term of this patent is extended or adjusted under 35 U.S.C. 154(b) by 0 days.

(21) Appl. No.: 09/261,897

(22) Filed: Mar. 3, 1999

(51) Int. Cl.$^7$ .......................... H04M 3/42; H04M 7/00; H04L 12/50
(52) U.S. Cl. ............................. 379/221.13; 379/211.02; 379/219; 370/360
(58) Field of Search ................................ 379/211, 207, 379/219; 370/360

(56) References Cited

U.S. PATENT DOCUMENTS

| 5,732,131 | A | * | 3/1998 | Nimmagadda et al. | 379/211 |
| 5,758,281 | A |   | 5/1998 | Emery et al. | |
| 5,854,836 | A | * | 12/1998 | Nimmagadda | 379/207 |
| 5,867,570 | A | * | 2/1999 | Bargout et al. | 379/207 |
| 5,912,962 | A | * | 6/1999 | Bosco | 379/219 |
| 6,097,801 | A | * | 8/2000 | Williams et al. | 379/207 |
| 6,108,332 | A | * | 8/2000 | Kasiviswanathan | 370/360 |

FOREIGN PATENT DOCUMENTS

| EP | 0792074 | 8/1997 |
| WO | WO9814027 | 2/1998 |
| WO | WO9844702 | 10/1998 |

OTHER PUBLICATIONS

PCT International Search Report PCT/US00/04962 dated May 18, 2000.
Faynberg et al., "The Intelligent Network Standards: Their Application to Services", McGraw–Hill, 1997, pp. 20–51.
"AIN Switch–Service ControlPoint/Adjunct Interface Generic Requirements", GR–1299–CORE, Dec. 1995, BellCore, pp. 3–1 thru 3–27.
"AIN Switch–Intelligent Peripheral Interface Generic Requirements", GR–1129–CORE, BellCOre, pp. 2–1 thru 2–11.
"BellCore Specification of SS7", GR–246–CORE, Dec. 1998, pp. 2–1 thru 5–6.
"Common Channel Signaling Network Interface Specification", GR–905–CORE, Mar. 1995, pp. 2–1–2–25.
"AIN 0.1 Switching Requirements", TR–NWT–001284, BellCore, pp. 2–1 thru 2–51.
"Telephone Number Portability: NANC Recommendation Concerning LNP Administration, Wireless and Wireline Integration", CC docket No. 95–116, NSD file No. L–98–84.
"Signaling Transfer Point (STP) Generic Requirements", GR–82–CORE, Dec. 1995, BellCore.
"Local Number Portability (LNP) Capability Specification: Service Provider Portability", GR–2936–CORE, Nov. 1997.
"Compatibility Information for Interconnection of a Wireless Services Provider and a Local Exchange Carrier Network", GR–145, Dec. 1993, Bellcore.

* cited by examiner

Primary Examiner—Ahmad Matar
Assistant Examiner—Thjuan P. Knowlin
(74) Attorney, Agent, or Firm—Skjerven Morrill MacPherson LLP (57) ABSTRACT

One-Number-Service (ONS) allows a subscriber to keep a single Directory Number when relocating to a different access point among one or more interconnected telecommunication systems. According to one aspect of the invention, a signaling packet for a call setup to a ported number is intercepted at an improved signal transfer point where a query to a database returns a new address of the exchange the number has ported to. The new address is used to update the signaling packet at the improved signal transfer point in order to set up the call to the ported exchange. According to another aspect of the invention, an improved exchange triggers to do a query to obtain the new address of the exchange the number has ported to. The new address is used to update the signaling packet at the exchange in order to set up the call to the ported exchange. Yet other aspects of the invention include combination of query and signaling packet processing at the signal transfer point and the exchange.

20 Claims, 8 Drawing Sheets

|     | IAM | CdPN (Called Party Nunber) | GAP (Generic Address Parameter) | FCI (Forward Call Indicator) | ..... |
| --- | --- | --- | --- | --- | --- |
| (a) | | | | | |
| (b) | Not Ported or before Query | DN | | | ..... |
| (c) | after LNP Query | LRN$_2$ | DN$_1$ | nth bit set to "1" after LNP query | ..... |
| (d) | after OSTP ONS Query | LRN$_3$ | DN$_1$ | | ..... |
| (e) | after Exchange ONS Query | LRN$_3$ | DN$_1$ | | ..... |

SYSTEM AND METHOD FOR LOCAL NUMBER PORTABILITY FOR TELECOMMUNICATION NETWORKS

FIELD OF INVENTION

The present invention relates generally to Directory Number portability in telecommunication systems, and more particularly to allowing a subscriber to keep a single Directory Number when relocating to a different access point among one or more interconnected telecommunication systems.

ACRONYMS

It is customary for the telecommunication industry to use acronyms when referring to established components and services. The ones that are used in this disclosure are listed as follow:

| | |
|---|---|
| AIN | Advanced Intelligent Network |
| AT | Access Tandem |
| CdPN | Called Party Number |
| CLEC | Competitive Local Exchange Carrier |
| DN | Directory Number |
| FCI | Forward Call Indicator |
| GAP | Generic Address Parameter |
| GTT | Global Title Translations |
| HLR | Home Location Register |
| IAM | Initial Address Message |
| ILEC | Incumbent Local Exchange Carrier |
| IN | Intelligent Network |
| IP | Intelligent Peripheral |
| ISDN | Integrated Services Digital Network |
| ISUP | ISDN User Protocol |
| LATA | Local Access Transport Area |
| LEC | Local Exchange Carrier |
| LIDB | Line Identification Database |
| LNP | Local Number Portability (Service Provider's) |
| LRN | Location Routing Number |
| LSMS | Local Service Management System |
| LTT | Line Translation Table |
| MSC | Mobile Switching Center |
| MTP | Message Transfer Part |
| NPA | Numbering Plan Area |
| NRA | Network Routing Address (see LRN) |
| NXX | Office Code |
| ONS | One Number Service - the number portable service provided by the present invention |
| OS | Operations Systems |
| PODP | 3/6/10 Digit Public Office Dialing Plan Trigger |
| POTS | Plain Old Telephone Service |
| PX | Programmable switch (also known as Intelligent Peripheral) |
| RT | Routing Table |
| SCCP | Signaling Connection Control Part |
| SCP | Service Control Point |
| SDS | Specific Digit String Trigger (PODP is the term used for this document) |
| SMS | Service Management System |
| 557 | Signaling System 7 |
| SSP | Service Switching Point |
| STP | Signal Transfer Point |
| TCAP | Transaction Capabilities Applications Protocol |
| VLR | Visitor Location Register |

BACKGROUND OF THE INVENTION

A Directory Number (DN) in traditional telephone systems is used to ring a telephone on a given line of a given local telephone exchange. A local exchange may be one of many interconnecting exchanges that constitute what is known as the Public Switched Telephone Network (PSTN). Each exchange, also referred to as a switch in PSTN, is provisioned with a plurality of access points or telephone lines, each addressable by a 4-digit extension [YYYY]. Subscribers may call each other on the PSTN by dialing each others Directory Number. In North America the DN is a 10 digit number and until recently it also represents the address of the exchange provisioning the DN. Each exchange is identified by a 6-digit exchange code [NPA-NXX] and the DN has been formed by concatenating the exchange code with the exchange extension in the format [NPA-NXX]-[YYYY].

The Directory Number (DN) then has been serving a dual function, namely as an address for an exchange and its extension, and also as a subscriber ID (identity) number by which the subscriber could be reached. It works well if the subscriber is fixed at the originally assigned access point or line. The problem arises when the subscriber moves to another access point. If the new access point is still served by the same exchange, the subscriber is usually allowed to keep the same number since the exchange could be reconfigured to provision the same extension number at the new access point. However, when the new access point is served by a different exchange, the subscriber can no longer retain the existing DN since the new exchange will have an exchange code different from that encoded in the original DN. The subscriber will have to be given a new DN appropriate for the new exchange. In either case, every time a subscriber makes a move, it may be days or weeks before the new service is in place.

Even if the subscriber has not moved outside the service area of an existing exchange, the subscriber may wish to switch to a more competitive service provider or to subscribe to other types of telecommunication services such as wireless, or internet or cable telephony.

From the foregoing description, it can be seen that there are three general types of number portability arising from moving from one access point to another. The first is Service Provider Portability which allows a subscriber to change access/service provider without changing the DN. The second is Location Portability which allows a subscriber to change physical locations without changing the Directory Number. The third is Service Portability which allows a subscriber to change service (e.g., POTS to ISDN) without changing the DN. In all cases, whenever the subscriber moves to a different exchange, the existing DN is no longer compatible with the address of the new exchange.

The lack of number portability is inconvenient for today's subscribers who tend to be more mobile and use a variety of telecommunication services. Furthermore, this impedes deregulation in the telecommunication industry, as it gives the incumbent service provider unfair advantage over a competing service provider. This is because a subscriber may be reluctant to change service provider if it also means a change of Directory Number.

Call forwarding is one prior art solution to location number portability. Call forwarding basically engages two directory numbers on two lines and redirects a first Directory Number to a second Directory Number. Depending on the capability of the switched network, there are two ways of implementing call forwarding. One is to encode the second Directory Number directly into the exchange switch. The other, when the switch is part of an IN/AIN switched network, is to trigger the switch on the DN to lookup second Directory Number from a network database.

Figure 1A:
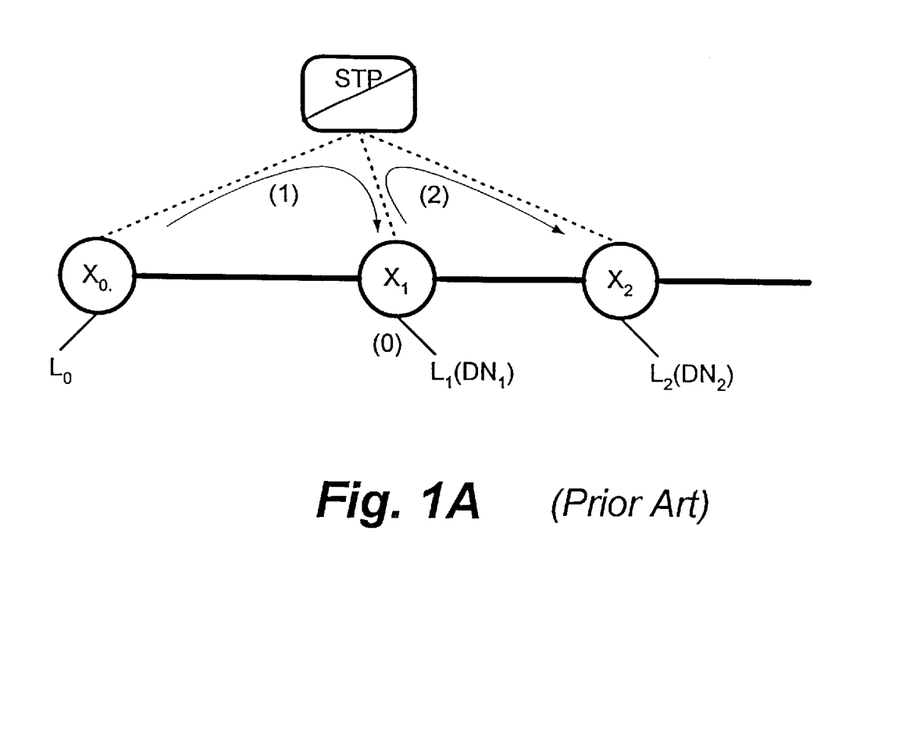
FIG. 1A illustrates a conventional call forwarding scheme by encoding the call forwarding information into the exchange switch.

FIG. 1A illustrates a conventional call forwarding scheme by encoding the call forwarding information into the exchange switch. A subscriber has a Directory Number DN1 on a telephone line L1 provisioned on an exchange X1. The subscriber is able to forward calls for DN1 to DN2, where DN2 is on a telephone line L2 provisioned on an exchange 2. The exchange X1 is programmed to respond to call-forwarding requests by the subscriber. In step (0), the subscriber can dial a special call-forwarding setup code on L1 and input into X1 the forwarding number DN2. The exchange X1 encodes this information in its Routing Table (RT) so that if a call to DN1 is received, it is rerouted to DN2 on X2 accordingly.

FIG. 1A shows a network of exchanges X0, X1 and X2 interconnected by voice trunks. Typically, when a call connection is to be made, a call stream is established serially from one exchange to another forming a series of circuits until the destination exchange is reached. Given the DN, each exchange has a RT that indicates which is the next exchange in the stream to establish the link. In order to setup the linkage (call setup) efficiently, the status and control signals associated with a call are carried in a digital network using a Signaling System 7 (SS7) protocol on it own network. The signaling is in the form of a digital packet know as Initial Address Message (IAM). The IAM packet is routed between exchanges or other points of the digital network by a Signal Transfer Point (STP) which is essentially a digital packet router. In the example shown, a call to DN1 originates from a line L0 of the exchange X0. The exchange X0 determines from its RT that DN1 resides in an exchange X1 and proceeds to set up the call. The call setup involves, in step (1), forming an IAM0(DN1) packet to be routed from X0 to X1 by the STP, and with which the a circuit between X0 and X1 is made available. At X1, its RT indicates that DN1 is forwarded to DN2 at X2. Then in step (2) an IAM1(DN2) packet reflecting the redirection is routed form X1 to the exchange X2 that is provisioning DN2 to set up the next leg of the circuit. In this way, a call made to DN1 is forwarded to connect at DN2.

The switch-based call-forwarding scheme has several disadvantages. Two Directory Numbers, DN1 and DN2, are engaged and therefore the solution is uneconomical. Furthermore, this two-number solution is not symmetric in that when dialing out from the forwarded-to line L2, the line is still identified with DN2. To set up the call-forwarding service, the subscriber must initiate it from the original access point L1. Also, the call routing is not efficient, as all calls for DN1 must first visit the original exchange X1 before being rerouted to X2.

Figure 1B:
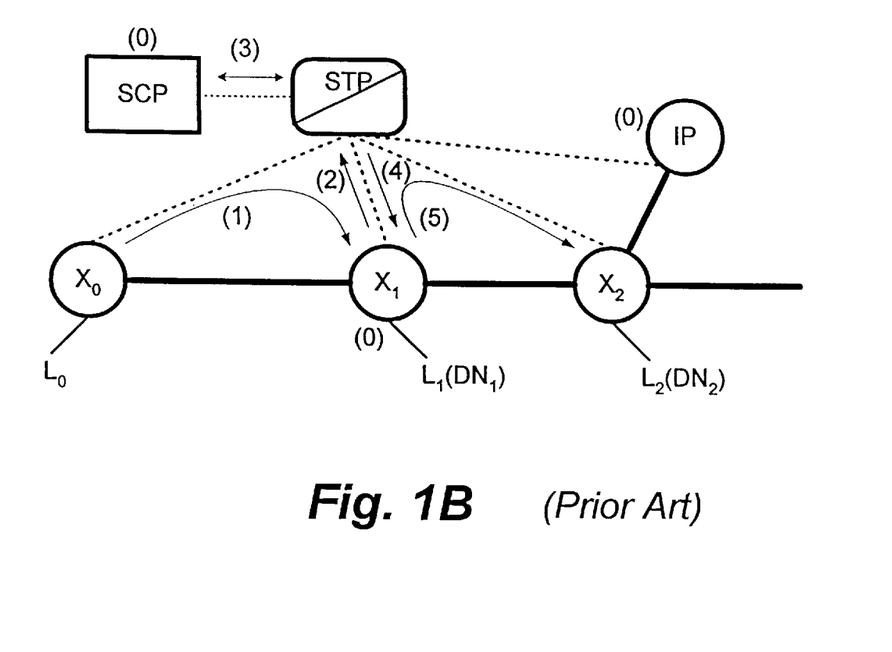
FIG. 1B illustrates another conventional call forwarding scheme as implemented by an Intelligent Network or Advanced Intelligent Network (IN/AIN)

FIG. 1B illustrates another conventional call forwarding scheme as implemented by an Intelligent Network or Advanced Intelligent Network (IN/AIN). In this type of intelligent network, the interconnecting switches X1, X2, . . . . cooperate with one or more programmable switch (PX) also known as Intelligent Peripheral (IP) and a database server known as Service Control Point (SCP).

In step (0), to activate the call-forwarding feature, a subscriber typically dials an 800 number which connects the subscriber to an IP. After authentication, the subscriber can input the original DN1 and the new DN2 number. The IP interacts with SCP to have the forwarding of DN1 to DN2 entered into the SCP. It then interacts with the switch X1 to have the call-termination trigger set on the switch to trigger on the call-forwarded number DN1. Subsequently, when a call to DN1 is received in X1, it will trigger X1 to obtain the call-forwarding information directing to DN2 by performing a lookup on the SCP. The switch X1 then uses the retrieved information to route the call to X2, L2.

In the example shown in FIG. 1B, a call to DN1 originates from a line L0 of the exchange X0. The exchange X0 determines from its Line Translation Table (LTT) that DN1 resides in an exchange X1 and proceeds to set up the call. The call set up involves, in step (1), forming an IAM0(DN1) packet to be routed by the STP to X1, by which the a voice circuit between X0 and X1 is made available. In step (2), at X1, the call to DN1 triggers a query through the STP to lookup forwarding information from the SCP. In step (3) the SCP returns the call forwarding information about DN2. In step (4) X1 uses the DN2 information to form its IAM1 (DN2) packet. Then in step (5) the IAM1(DN2) packet is routed form X1 to the exchange X2 that is provisioning DN2 to set up the next leg of the voice circuit. In this way, a call made to DN1 is forwarded to connect at DN2.

The intelligent network-based call-forwarding scheme improves on the switch-based scheme in that the call-forwarding information is not hard-coded into the exchange but rather retrievable from a more flexible database. The service need not be set up at the original access point L1 but could be set up by the subscriber from any access point including L2 that has access to the IP. Otherwise, it still has the same disadvantages as that of switch-based scheme.

Another prior art solution to number portability is directed to Service Provider Portability which is a result of recent government mandates in the United States of America. There has been legislation to deregulate the telecommunication industry, primarily to transform a monopolistic industry controlled by a handful of tightly regulated incumbent telephone companies to a plurality of competing telecommunication companies operating in a free market setting. To this end, any conditions that accord unfair advantages to the incumbent companies must be dismantled. As mentioned before, user inertia owing to the lack of number portability among service providers is one such concern. This concern has been addressed in the United States Communications Act of 1996. The 1996 Act defines (Service Provider) "number portability" as "the ability of users of telecommunications services to retain, at the same location, existing telecommunications numbers without impairment of quality, reliability or convenience when switching from one telecommunications carrier to another." Overseeing compliance of the 1996 Act, the United States Federal Communications Commission (FCC) has ordered telephone companies to implement Service Provider Portability according to the Local Routing Number (LRN) method. The LRN method is specified in a series of publications, the latest of which is "Generic Switching and Signaling Requirements, Issue 1.05, Aug. 1, 1997, editor: J. J. Lichter, Lucent Technologies.

The essence of LRN method is to decouple the subscriber's ID function from the exchange address function of the Directory Number (DN). The DN will be considered primarily as an ID number for a given subscriber. The exchange that has ported numbers will have an address independently and uniquely given by the Local Routing Number (LRN) which is a 10-digit number. If the DN is not ported from its originating exchange, then the exchange's LRN can still be obtained from the DN. On the other hand, if the DN is ported to a second exchange, then the second exchange must be addressed by its own LRN which is different from that obtained from the DN.

Figure 2:
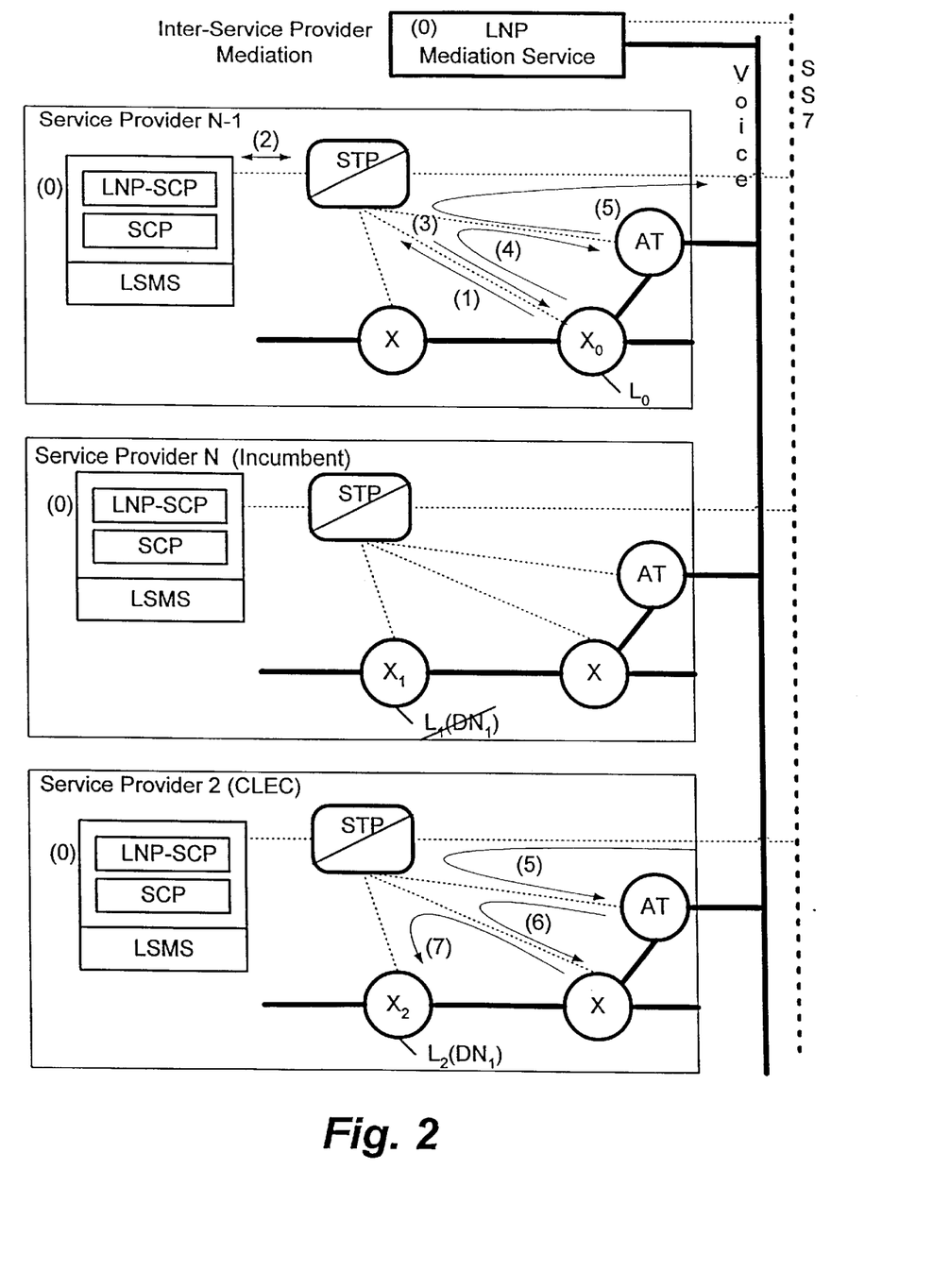
FIG. 2 illustrates the LRN scheme for implementing Service Provider Portability as required by the U.S. Local Number Portability MNP) authorities.

FIG. 2A illustrates the LRN scheme for implementing Service Provider Portability as required by the United States Local Number Portability (LNP) authorities. The LNP scheme is designed for DN portability from one service provider to another servicing the same locality or Local Access Transport Area (LATA). Initially, it will offer DN portability between an Incumbent Local Exchange Carrier (ILEC), shown as Service Provider N, and a Competitive Local Exchange Carrier (CLEC), shown as Service Provider 2. Basically, it employs the dynamic lookup capability of an IN/AIN switched network In addition to the SCP database, each service provider is provisioned with an additional LNP-SCP database for storing the routing information for a ported subscriber. In particular, the routing information will contain the LRN of an exchange that a given DN has ported to. When a call to a DN that has been predefined as LNP portable, the Service Control Point's (SCP) service logic programmed in the exchange will initiate an AIN or IN based LNP query to the LNP-SCP to obtain the LRN for the destination exchange to which the DN that has been ported. The queried LRN is then returned to the exchange to route the call accordingly.

In the example shown, a subscriber was given DN1 when originally subscribed to a line L1 provisioned by an exchange X1 of Service Provider N. When the subscriber subsequently changes to Service Provider 2, DN1 has been ported to a line L2 on an exchange X2. In step (0) the change in service provider is submitted by both Service Provider N and Service Provider 2 to an inter-service provider mediation service who oversees the incorporation of the porting information into the LNP-SCP databases of the various service providers. Thus, over a period of days or weeks, the porting information, DN1 together with the address of X2 (i.e. LRN(X2))) are entered into the respective LNP-SCP of Service Provider N, Service Provider 2 and Service Provider N−1 as shown in FIG. 2.

In addition to mediation and storing of LRNs in the LNP-SCP database of the various service providers, the LNP implementation also mandates the exchanges to be "LNP-enabled", i.e. upgraded to be able to handle the LRN scheme.

At some point, a connecting exchange must look up the ported information from one of the LNP-SCPs in order to complete the circuit to the ported location. Part of the LNP scheme is to minimize the burden imposed on the service provider being ported from (Service Provider N) for doing the lookup, but to let the service provider adjacent to it (Service Provider N−1) to perform the lookup and routing. Thus, when a call is made to DN1, it is typically routed to Service Provider N−1 before attempting to do a lookup.

In the example shown in FIG. 2, a call to DN1 is made from a line L0 in one of the exchanges X0 of Service Provider N−1. In step (1), the LNP-enabled exchange triggers on DN1 to do a query for LRN. In step (2), this induces a STP to lookup LRN(DN1) from LNP-SCP. In step (3), the address of the destination exchange, X2=LRN(DN1), is returned to X0. In step (4), a call setup is initiated from X0 to an Access Tandem exchange (AT). The LAM0(DN1, LRN(DN1)) being routed from X0 to AT now has the LRN of X2. In step (5), the AT set ups the next leg of the connection and connects into the domain of the Service Provider 2 containing the destination exchange X2. In steps (6) and (7), through call setups, the connection is made all the way to the destination exchange X2 where the call is connected to a designated line L2.

Since only one LNP-SCP lookup need be made to obtain the porting information, the exchanges are designed to sense whether a lookup has been made or not. This is accomplished in the LRN method by setting a flag in the IAM signaling packet that is passed from exchange to exchange. The LRN method specifies that the nth bit of the Forward Call Indicator (FCI) field of the IAM is to be used for this purpose (See FIG. 5(a)). If an LNP-SCP lookup has not been made, the exchange responsive to that condition will initiate a lookup, otherwise no lookup will be made.

Figure 5:
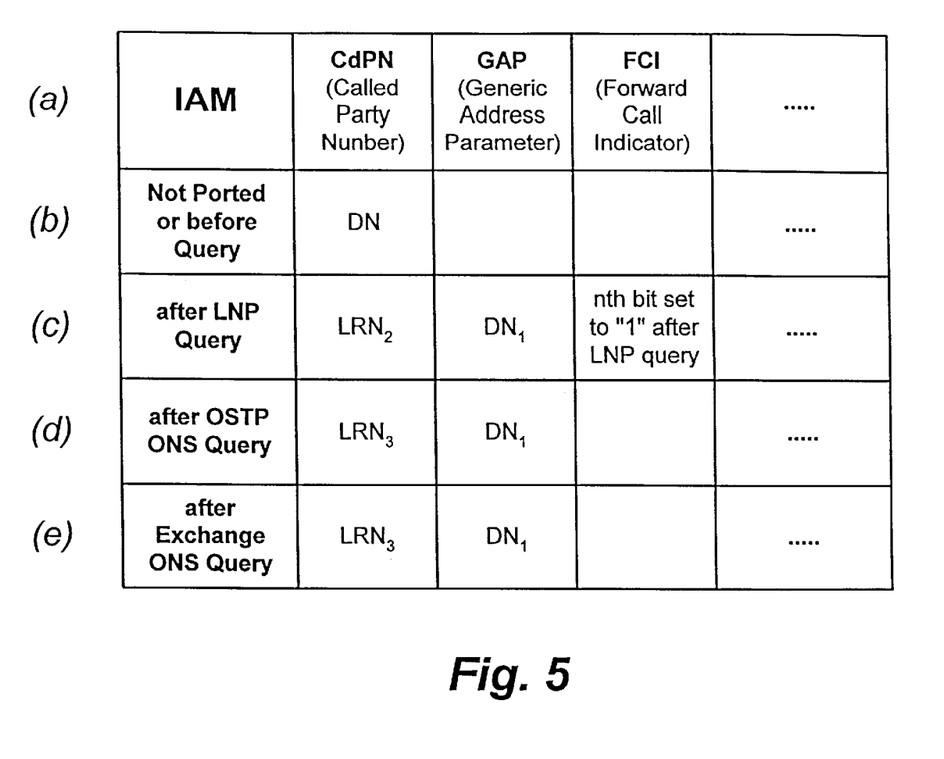
FIGS. 5(a)–5(e) list a number of fields in the ISUP Initial Address Message (IAM) that have bearing on number portability.

FIG. 5(c) shows the IAM field values after a LNP query. This applies to the case in which a DN1 originated from an exchange X1 is ported to an exchange X2 with an address LRN2 using the LRN method. In the LRN method, the address of the destination exchange is obtained from the CDPN field. Thus, it is the field in which the Local Routing Number (LRN) is entered. After an LNP query, the address of the destination exchange LRN2 is returned and placed in the CDPN field. Under the LRN method, the GAP field is used to store the directory number DN1. Also, after an LNP query has been performed, the nth bit of the FCI field is set to "1"to prevent subsequent exchanges from repeating the query.

U.S. Pat. No. 5,758,281 issued May 26, 1998 to Emery et al. discloses a system for allowing a user to send and receive calls from a single portable handset using a single assigned number whether at home or roaming.

The following publications discloses Advance Intelligent Network (AN) and their exchanges, SS7, STP and the LNP scheme, relevant portions of them are incorporated herein by reference.

"The Intelligent Network Standards: their application of services", Faynberg, I., et al, McGraw-Fill, 1997

"Mobile and Wireless Networks", Black, Uyless. Prentice Hall, 1996.

"BellCore specification of SS7", GR-246-CORE, Decmber. 1995, BellCore.

"Common Channel Signaling Network Interface Specification", GR-905-CORE, March 1995, BellCore.

"ITU-TS specifications of signaling system Number 7", CCITT "white Book" Volume VI, Fasciles VI.7, VI.9 (Q.700 Series Recommendations).

"AIN 0.1 Switching Requirements", TR-NWT-001284, BellCore

"AIN 0.2 Switch-Intelligent Peripheral Interface Generic Requirements", GR-1129-CORE, BellCore "AIN Switch-Service Control point/ Adjunct Interface Generic Requirements", GR-1299-CORE, Decmber. 1995, BellCore "LNP capability specifications", GR-2936-CORE Draft, May 1996, BellCore.

"STP generic Requirements", GR-82-CORE, December. 1995, BellCore.

"Compatibility Information for Interconnection of a wireless service provider and a local exchange carrier network" GR-145, May 1998, BellCore "Telephone Number Portability; NANC Recommendation concerning LNP administration, wireless and wireline integration", CC docket No. 95-116, NSD file No. L-98-84

The LRN method has been designed to narrowly address number portability between service providers serving the same locality. While the LRN method introduces the important feature of LRN addressing of the exchanges, independent of the Directory Number, there remains no universal single-number portability solution. For example, given the service provider LNP implementation, a subscriber may retain the DN when switching service provider within the same LATA, but still has problems when moved to another exchange. Similarly, the problem of having a single DN between wire-line and wireless, or between other communication systems such as internet or cable telephony, is still not addressed.

It would be desirable for the subscriber to be able to retain his or her Directory Number when accessing from different access points of a plurality of interconnected communication systems.

OBJECTS AND SUMMARY OF THE INVENTION

Accordingly, it is a general object of the present invention to provide a system and method for number portability from one access point to another among one or more interconnected telecommunication systems.

It is an object of the present invention to provide a system and method for One-Number-Service (ONS) which enables a subscriber's directory number to be easily ported from one access point to another among one or more interconnected telecommunication systems.

It is an object of the present invention to provide a system and method for One-Number-Service (ONS) which enables a subscriber's directory number to be easily ported from one access point to another among a Local Access Transport Area (LATA).

It is an object of the present invention to provide a system and method for One-Number-Service (ONS) which enables a subscriber's directory number to be easily ported from one service provider to another service provider.

It is an object of the present invention to provide a system and method for One-Number-Service (ONS) which enables a subscriber's directory number to be easily ported between different telecommunication services.

It is an object of the present invention to provide a cost effective and reliable system and method for number portability from one access point to another among one or more interconnected telecommunication systems.

These and additional objects are accomplished by providing a system and method for maintaining and accessing number portability information in order to complete a call to a ported directory number to its ported location. In particular these objects are accomplished by enhancing existing telecommunication systems in a cost effective manner, with minimum modification.

According to one aspect of the invention, in an intelligent (IN/AIN) telecommunication network system, the Signal Transfer Points (STPs) are enhanced into One-Number-Service STPs or (OSTPs) to query the address of the exchange the directory number has ported to during a call setup process and to modify the call setup accordingly. In particular, the directory number contained in the signaling packet for a call setup is examined and used to look up a database containing the new address (LRN) of the exchange the directory number has ported to. The address field for the destination exchange in the signaling packet is then updated with the new address in order for the call setup to complete the call to the ported exchange.

In one embodiment, all ported numbers, whether they are LNP-ported numbers (i.e., between service providers by the LRN method) or ONS-ported numbers (i.e., between two access points in general) are processed by OSTP query during call setup.

In another embodiment, where the telecommunication network system supports Service Provider portability or MNP), directory numbers that are LNP-ported are handled by the LNP scheme which requires an LNP-enabled exchange to perform a query by means of a Transaction Capable Application Part (TCAP) signaling via a STP to a database containing the new address (LRN) of the exchange the directory number has ported to. One-Number-Service (ONS) portability is accomplished by using the LNP scheme to handle the LNP-ported numbers and the OSTP query during call setup for other non LNP-ported directory numbers or for LNP directory numbers that have been ported more than once.

The conventional LRN method is very expensive as it involves costly modification to all the exchanges. In any case, it still does not address other number portability outside that of service providers'. The ONS scheme provided by OSTP query during call setup is advantageous because unlike the LRN method the plurality of interconnecting exchanges need not be modified, instead, only the relatively fewer STPs need be enhanced to become OSTPs.

According to another aspect of the invention, where the telecommunication network system supports Service Provider portability or (LNP), directory numbers that are LNP-ported are handled by the LNP scheme which requires an LNP-enabled exchange to perform a query by means of a TCAP signaling via a STP to a database containing the new address (LRN) of the exchange the directory number has ported to. When One-Number-Service (ONS) portability is applied within a service provider's domain, it is accomplished by an enhanced STP with TCAP processing that responsive to an ONS-ported number, queries a database containing ONS porting information.

According to yet another aspect of the invention, the exchanges among the telecommunication network system are enhanced to query a database containing LNP porting information in response to an LNP-ported directory number, and to query a database containing ONS porting information in response to an ONS-ported directory number.

Additional objects, features and advantages of the present invention will be understood from the following description of the preferred embodiments, which description should be taken in conjunction with the accompanying drawings.

BRIEF DESCRIPTION OF THE DRAWINGS

FIG. 9 is a flow diagram illustrating the actions and signaling of an Exchange and a Signal Transfer Point (SIP)

when implementing Single-Number-Service (ONS) according to another aspect of the present invention.

DETAILED DESCRIPTION OF THE PREFERRED EMBODIMENTS

Figure 3:
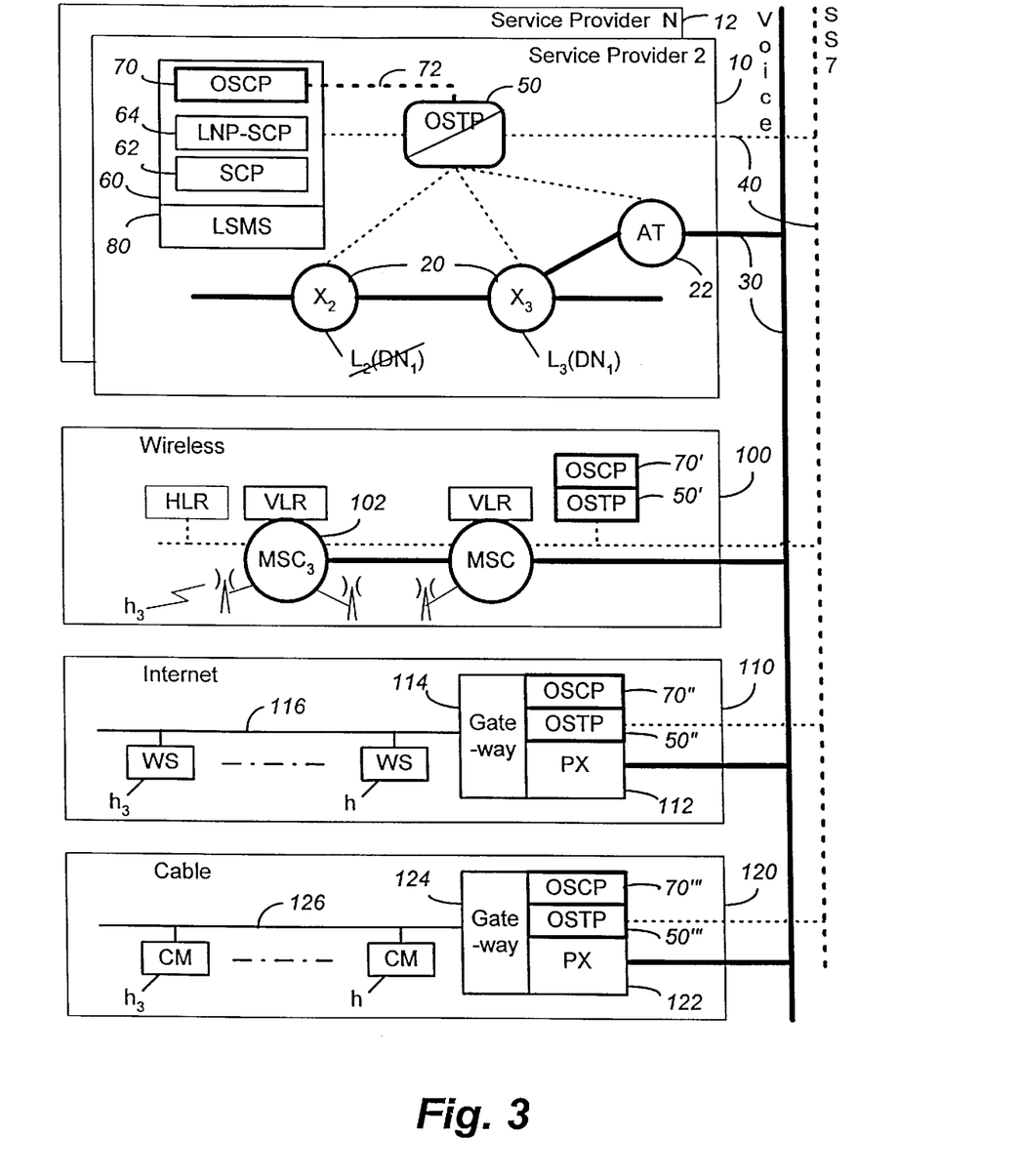
FIG. 3 is a schematic illustration of a typical operating environment of the present invention for implementing One-Number-Service (ONS) in which a directory number may be retained when moving from one access point to another among interconnected telecommunication systems.

FIG. 3 is a schematic illustration of a typical operating environment of the present invention for implementing One-Number-Service (ONS) in which a directory number (DN1) may be retained when moving from one access point to another among interconnected telecommunication systems.

A public switched telephone network (PSTN) is constituted from a plurality of local domains such as domains 10, 12, individually operated by different service providers such as Service Provider 2 and Service Provider N. Each local domain provides telephone service through access lines such as L2 and L3 provisioned in one or more exchanges 20 such as X2 and X3. The exchanges are interconnected by a voice trunk network 30 and are connectable to other portions of the PSTN via an access tandem (AT) 22.

Signaling between the exchanges 20 is carried by a SS7 (Signal System 7) network 40. One or more Signal Transfer Point (STP) is provided to route the SS7 signals between points in the SS7 network. Each exchange has a SS7 network interface known as its Service Switching Point (SSP) (not shown). Each exchange represents a point in the SS7 network and is addressable by a point code. In a local domain, typically there are from tens to over one hundred exchanges serviced by a pair of STPs.

According to one aspect of the invention, at least one STP enhanced with the features of the invention and denoted by OSTP 50 is provided at each local domain. The OSTP is preferably located as a gateway STP such that it can receive and process signaling first entering the domain.

In an Intelligent or Advanced Intelligent Network (IN/AIN), a set of databases 60 as provided by one or more Service Control Point (SCP) such as 62, 64 may be installed as a point in the SS7 network. The SCP 60 is a database for providing service related information or number porting information and is available for an exchange to retrieve information dynamically via an STP. As described earlier, in a network where service provider portability has been implemented, a LNP-SCP 62 has been added to store service provider number porting information. In one preferred embodiment of the present invention, a database OSCP 70 for storing information about ported number across arbitrary access points is also provided. The OSCP 70 is connectable to the OSTP 50 via the SS7 network 40 and/or via a high-speed connection 72. The set of databases 60 is maintained by a Local Service Management System (LSMS) 80.

The One-Number-Service (ONS) of the present invention provides number portability across arbitrary access points among a plurality of interconnected telecommunication systems and therefore encompasses directory number portability across different locations, different services, as well as different service providers.

One or more wireless telephone domain 100 is connectable to the PSTN via connection to the voice trunk network 30 and the SS7 signaling network 40. Each wireless domain 100 provides wireless telephone service through access channels provisioned in one or more mobile switching center (MSC) 102. Each access channel is assignable to a subscriber's mobile handset such as h3. The MSCs serve as the counterpart to the exchange and STP of the PSTN and are connected to the voice trunk 30 and the SS7 network 40. The wireless telephone domain 100 typically operates with a number of databases to keep track of the subscribers. A Visitor Location Register (VLR) is used to keep track of subscribers active among the cells served by the MSC. Similarly, a Home Location Register (HLR) is used to keep track of the home location of a subscriber. In the preferred embodiment, a STP enhanced with the features of the invention and denoted by OST 50' is provided in each wireless domain 100. Also, a database OSCP 70' for storing information about ONS ported numbers is provided for operation with the OSTh 50'.

One or more internet telephony domain 110 is connectable to the PSTN via connection to the voice trunk network 30 and the SS7 signaling network 40. Each Internet telephony domain 110 provides internet telephone service through a programmable switch (PX) 112 where a plurality of access lines are provisioned therein. The PX 112 serves as the counterpart to the exchange of the PSTN and are connected to the voice trunk 30 and the SS7 network 40. An internet gateway 114 serves to connect the provisioned access lines to access points on an internet network 116 such as a handset h3 installed on a workstation. In the preferred embodiment, a STP enhanced with the features of the invention and denoted by OSTP 50" is provided in each internet telephony domain 110. Also, a database OSCP 70" for storing information about ONS ported numbers is provided for operation with the OSTP 50". Reference to IP-telephony may be found, for example, in ITU-T, Visual Telephone Systems and Equipment for Local Area Networks, Which Provide a Non-Guaranteed Quality of Service, Rec. H.323, November. 1996, Geneva, Switzerland, the disclosure of which is herein incorporated by reference.

One or more cable telephony domain 120 is connectable to the PSTN via connection to the voice trunk network 30 and the SS7 signaling network 40. Each cable telephony domain 120 provides internet telephone service through a programmable switch (PX) 122 where a plurality of access lines are provisioned therein. The PX 122 serves as the counterpart to the exchange of the PSTN and are connected to the voice trunk 30 and the SS7 network 40. A cable gateway 124 serves to connect provisioned access lines access points on a cable network 126 such as a handset h3 installed on a cable modem on the cable network. In the preferred embodiment, a STP enhanced with the features of the invention and denoted by OSTP 50''' is provided in each cable telephony domain 110. Also, a database OSCP 70''' for storing information about ONS ported numbers is provided for operation with the OSTP 50'''.

Figure 4:
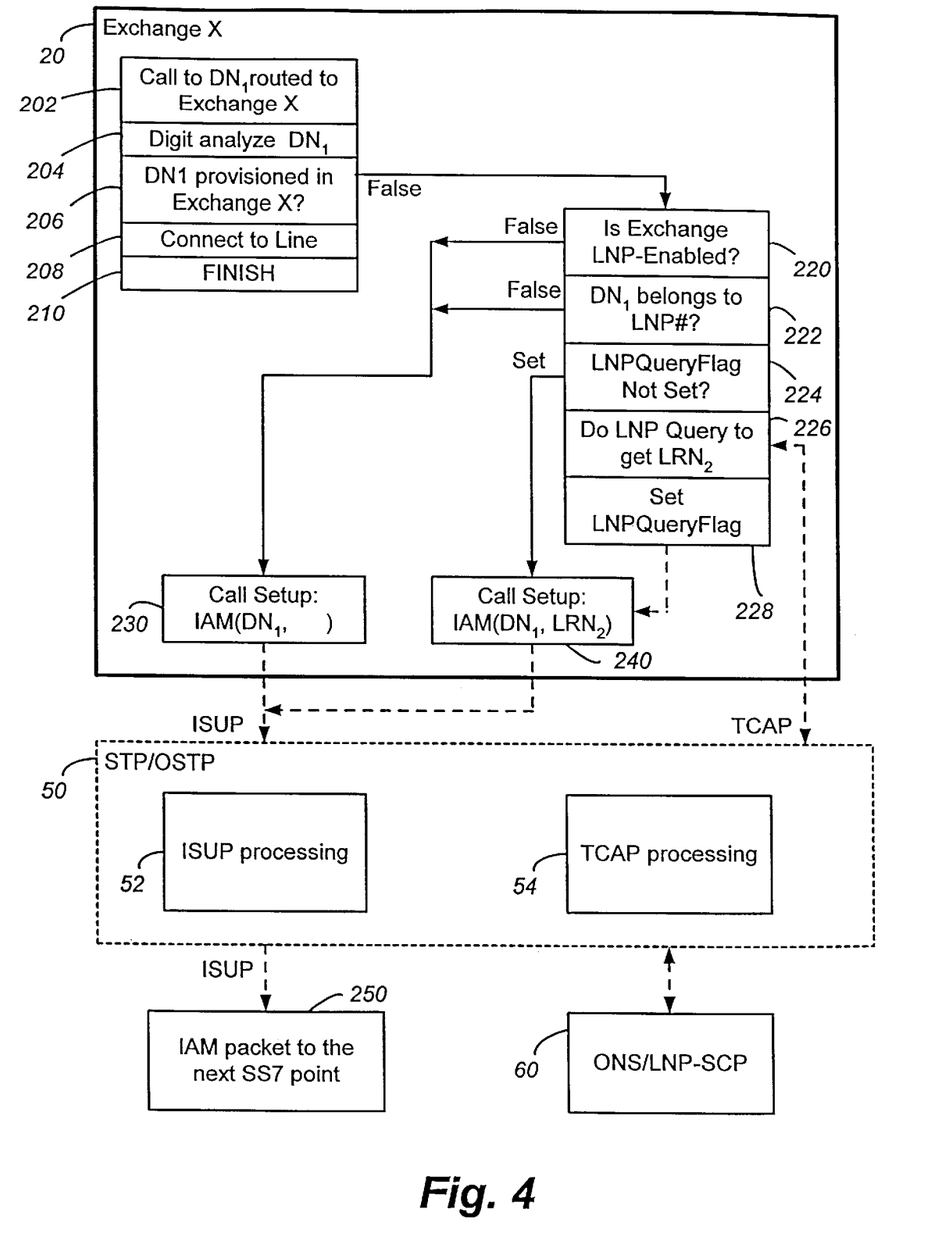
FIG. 4 is a flow diagram illustrating the actions and signaling of an exchange and an Enhanced Signal Transfer Point (OSTP) when implementing One-Number-Service (ONS) according to a general embodiment of the present invention.

FIG. 4 is a flow diagram illustrating the actions and signaling of an exchange X 20 and an Enhanced Signal Transfer Point (OSTP) 50 when implementing One-Number-Service (ONS) according to a general embodiment of the present invention.

Step 202: A call to the directory number DN1 is routed to the present Exchange X.
Step 204: A digit analysis is performed on DN1
Step 206: DN1 is checked against a line translation table (LLT) to see if the number is provisioned in Exchange X. Control proceeds to Step 208 if it is, otherwise control proceeds to Step 220.
Step 208: Since DN1 is provisioned in Exchange X, connection is made to access line to complete the call.
Step 210: Call connection is completed.
Step 220: Since DN1 is not provisioned in Exchange x attempt is made to determine which exchange it resides on. First, it is determined if Exchange X is LNP-enabled. If it is, LNP lookup of the LRN (address) of the designation exchange is possible and control proceeds to Step 222. Otherwise, it is just a standard exchange and a standard call setup is done in Step 230.

Step 222: Since Exchange X is LNP-enabled, next, DN1 is checked to determined if it is native to a LNP-enabled exchange. If it is, control proceeds to Step 224 for the next step in LNP lookup. Otherwise, DN1 is native to a non-LNP-enabled exchange and a standard call setup is done in Step 230.

Step 224: Since DN1 has been determined to be in the LNP scheme, a lookup to determine the LRN of the exchange it has ported to is possible. In this case, DN1 was originally provisioned on Line L1 of Exchange X1 of Service Provider 1 (not shown). It has since been ported to L2 of X2 of Service Provider 2. The LNPQueryFlag in the IAM message is checked to see if an LNP lookup has already been made. If the flag is not set, control proceeds to do an LNP lookup in Step 226. Otherwise, LNP lookup has already been done and control proceeds to Step 240.

Step 226: A TCAP signal is issued to the OSTP 50 to perform a LNP lookup. The STP or OSTP uses the SCCP (Signaling Connection Control Part of the exchange) to process and route the TCAP (Transaction Capabilities Applications Protocol) message to the SCP or OSCP. The OSTP 50 processes the TCAP request with TCAP processing component 54 whereupon the database 60 is looked up using DN1 to retrieve the associated LRN2. The address of the destination exchange is then returned by the OSTP 50 to the Exchange X 20, and control proceeds to Step 228.

Step 228: The LNPQueryFlag in the IAM is set to prevent further LNP lookups. Control then proceeds to Step 240.

Step 230: The IAM is one of a standard IAM and is sent as an ISUP signal to the OSTP 50.

Step 240: The IAM already contains the LRN2 of the destination address obtained from a previous LNP lookup, and is sent as an ISUP signal to the OSTP 50 to be processed by the ISUP processing component 52.

Step 250: After processing by the ISUP processing component 52, the IAM packet is routed from the OSTP 50 to the next point in the SS7 network.

FIGS. 5(a)–5(e) list a number of fields in the ISUP Initial Address Message (IAM) that have bearing on number portability. FIG. 5(a) shows the names of three fields of interest, namely, Called Party Number (CdPN), Generic Address Parameter (GAP) and Forward Call Indicator (FCI).

FIG. 5(b) illustrates the IAM field values during a call setup of a non-ported DN or one whose ported address has not been queried. The CdPN field basically carries information about the address of the destination exchange. In this case, the address of the destination exchange is simply given by the NPA-XXX portion of the DN, and therefore DN is entered in the CdPN field.

FIG. 5(c) shows the IAM field values after a LNP query. This applies to the case in which a DN1 originated from an exchange X1 is ported to an exchange X2 with an address LRN2 using the LRN method. In the LRN method, the address of the destination exchange is obtained from the CdPN field. Thus, it is the field in which the Local Routing Number (LRN) is entered. After an LNP query, the address of the destination exchange LRN2 is returned and placed in the CdPN field. Under the LRN method, the GAP field is used to store the directory number DN1. Also, after an LNP query has been performed, the "nth" bit of the FCI field is set to "1" to prevent subsequent exchanges from repeating the query.

Figure 6:
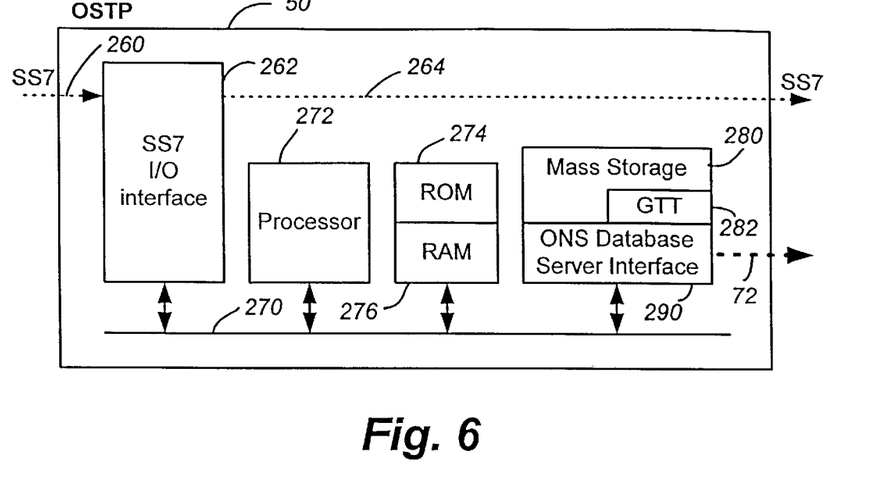
FIG. 6 is a functional block diagram of an enhanced Signal Transfer Point (OSTP) according to a preferred embodiment of the present invention.

FIG. 6 is a functional block diagram of an enhanced Signal Transfer Point (OSTP) according to a preferred embodiment of the present invention. As mentioned earlier, the network of voice trunks are switched by a plurality of interconnecting exchanges to establish a voice trunk circuit for a call. At the same time, the signaling associated with the call process is transported by a Signal System 7 (SS7) network in which one or more Signal Transfer Points (STPs) performs the switching to transfer the signaling packet from one point to another point among the SS7 network. With each exchange having a SS7 interface, namely a Service Switching Point (SSP), it is a transfer point in the SS7 network from which the STP transfers the signaling from one exchange to another exchange. Typically, an exchange issues a SS7 signaling packet to a STP, and the STP assigns the address of the next transfer point (point code) in the SS7 network and switches the signaling packet on its way towards the next transfer point which may be another exchange, STP or some other destination in the SS7 network.

In FIG. 6, the OSTP 50 is a STP enhanced with the features of the present invention. A SS7 I/O interface controller 262 receives a SS7 packet from an input 260 and allows it to interact with a processor-based intelligent system before sending it out as an output SS7 packet via an output 264. An internal bus 270 couples the processor-based intelligent system to the SS7 I/O interface controller 262. The processor-based intelligent system further comprises a processor 272 that operates in conjunction with a number of memories. A read-only-memory (ROM) 274 is used to store firmware for the processor. A random-access-memory (RAM) 276 provides the memory space for the processor 272 to operate in. A mass-storage 280 provides non-volatile and easily updateably storage of programs and other information including possibly routing and number porting information. A Global Title Translation table (GTT) 282 is preferably maintained in the mass-storage 280. The GTT is basically a routing table for looking up a point code (address in the SS7 network) with a given directory number.

In one embodiment, number porting information in the form of an ONS-SCP database is also stored in the mass storage 280 within the OSTP 50. In another embodiment, the ONS-SCP database resides in an external database server (see FIG. 3) and communicates with the OSP 50 via a high-speed link 72 to an ONS Database Server interface 290 coupled to the internal bus 270.

The SS7 protocol has two main stacks in a multi-layer structure: an ISDN User Part (ISUP); and a Transaction Capability Application Part (TCAP). ISUP signaling is used to communicate call setup information. As mentioned in an earlier section, the call setup information is embodied in an Initial Address Message IAM. Signaling that is of a query nature is communicated using the TCAP. TCAP signalings are becoming more common with the advent of intelligent networks, as there are increasing applications in which the call process includes a query to a database (SCP) on the network.

Figure 7:
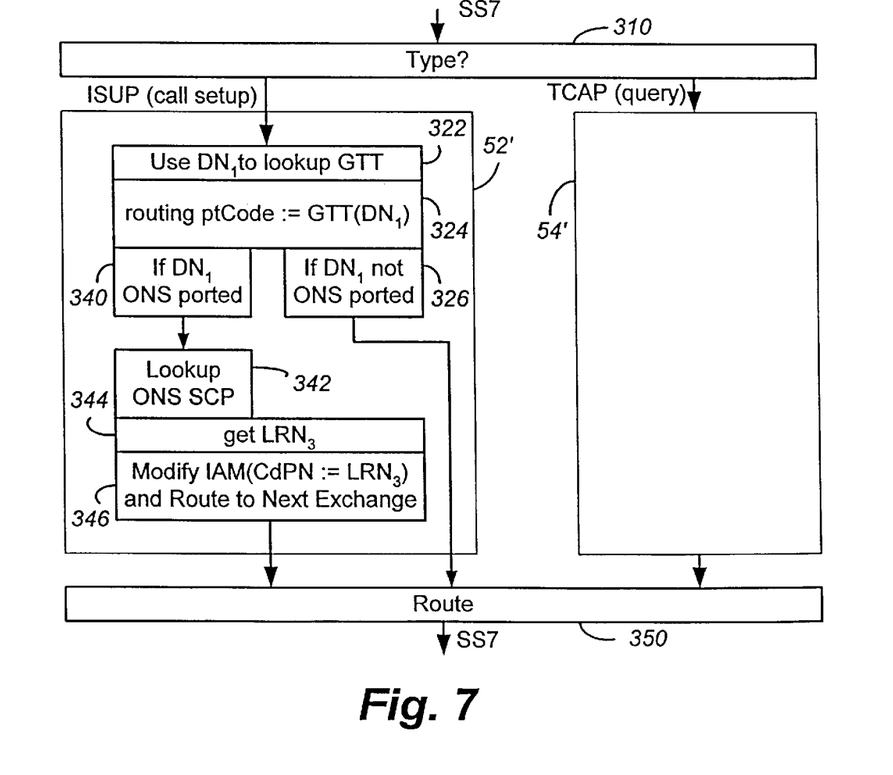
FIG. 7 is a flow diagram of the call setup processing of the OSTP packet switch of FIG. 6 for implementing One-Number-Service (ONS) portability according to a preferred embodiment of the present invention.

FIG. 7 is a flow diagram of the call setup processing of the OSTP packet switch of FIG. 6 for implementing One-Number-Service (ONS) portability according to a preferred embodiment of the present invention. As described in an earlier section, a call circuit transverses the network from an originating exchange to the destination exchange. The circuit is established exchange-by-exchange with the aid of call setup signaling in the form of the IAM being transferred from exchange to exchange by means of the OSTP. In particular, the GAP field and the CdPN field in the IAM enables the next exchange to be determined along the formative circuit.

In step 310, an input SS7 message is analyzed to determine if it is an ISUP (call setup) message or a TCAP (query) message. If it is an ISUP message, it is processed through an ISUP block 52'. If it is a TCAP message, it is processed through a TCAP block 54'.

In the present embodiment, the TCAP block 54' basically processes the same way as a conventional STP in executing a LNP query. The STP uses SCCP layer for GTT. This means that a TCAP query is directed to a SCP database, and the returned result is in turn returned by the STP in step 350 to the querying exchange.

The ISUP block 52' basically receives the call setup message as an Initial Address Message (IAM) and processes it in the following steps:

Step 322: the directory number DN1 is parsed out from the input IAM message.

Step 324: Whether DN1 is ported or not would have previously been entered into the Global Title Translation (GTT) table in the OSTP. The entry for the directory number DN1 is looked up to obtain the point code (address of the next point in the SS7 network.)

Step 326: The entry for DN1 in the GTT is coded such that if DN1 is not ONS (One-Number-Service of the present invention) ported, there is no entry found in the GTT and the default point code would be the same as that of a conventional STP in processing a call setup, and the IAM would be sent out of the OSTP in Step 350 to the next point in the SS7 network.

Step 340: The entry for DN1 in the GTT is coded such that if DN1 is ONS (One-Number-Service of the present invention) ported, there would be an entry found in the GTT and the looked up point code would point to an ONS-SCP database.

Step 342: The ONS-SCP is looked up by the OSTP using DN1.

Step 344: The address of the exchange LRN3 to which DN1 has ported to is returned.

Step 346: The OSTP modifies the IAM by updating the CdPN field with LRN3 (see FIG. 5(e)), and the control proceeds to step 350.

Step 350: The IAM message, either unmodified from step 326 or modified from step 346, is output from the OSTh to the next point in the SS7 network which is the next leg of the call setup process.

One feature of the present aspect of the invention is to implement database lookup of ONS ported numbers by means of an enhanced STP, instead of the LNP method of enhancing the exchange to initiate the lookup via the TCAP component of a STP. The IAM in an ISUP message is modified on-the-fly with the looked up LRN.

FIG. 5(d) illustrates the state of the IAM after OSTP initiated ONS lookup. Again, the address of the destination exchange LRN3 is returned from the ONS-SCP and placed in the CdPN field of the IAM.

In contrast, in conventional STP routing of the IAM packet, the exchange issuing the IAM already determines where the packet should go. The routing is done at the lower, Message Transfer Part (MTP) layer, and the STP routes the packet directly to the next point in the SS7 network.

Figure 8:
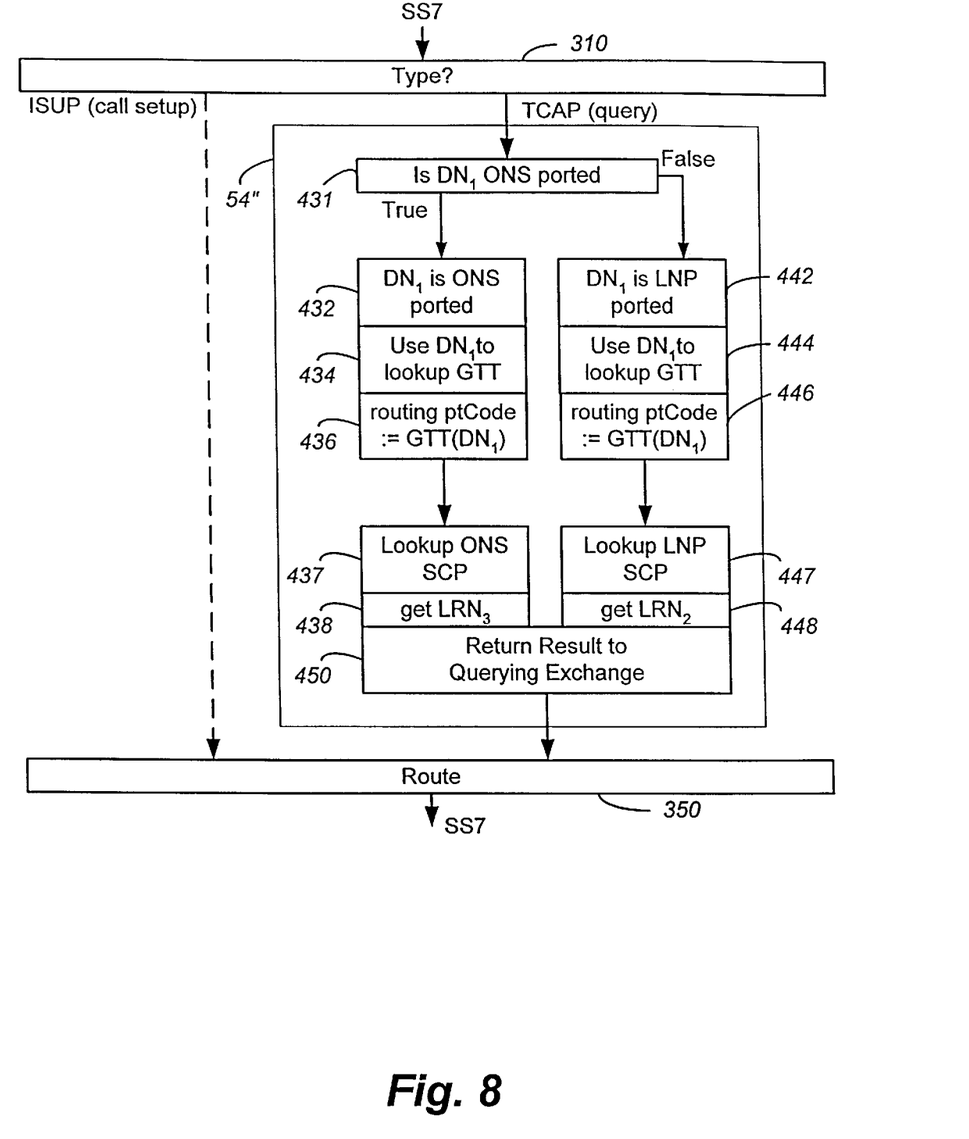
FIG. 8 is a flow chart for implementing One-Number-Service (ONS), according to another aspect of the present invention.

FIG. 8 is a flow chart for implementing One-Number-Service (ONS), according to another aspect of the present invention. The infrastructure set up to perform LNP portability is employed to implement the ONS portability of the present invention. As described in an earlier section, LNP portability is implemented by an LNP ported number first being recognized at a LNP-capable exchange. This will trigger a query to an LNP database (LNP-SCP). The query is done via a STP in which the ISUP part is conventional, but the TCAP part of the SS7 message enables lookup to either an ONS or LNP database and the STP returns a query result to the exchange.

In the present embodiment, a TCAP block 54" is improved over that of a conventional STP in executing a LNP type query. In particular, the LNP type query is further determined whether it is an whether it is an ONS query in which case an ONS database should be looked up, or an actual LNP query in which case an LNP database should be looked up. In either cases, the queried result is returned by the STP to the querying exchange.

In step 310, an input SS7 message from an exchange is analyzed to determine if it is an ISUP (call setup) message or a TCAP (query) message. If it is an ISUP message, it is processed conventionally and proceeded to be routed to the next point in the SS7 network via the output step 350. If it is a TCAP message, it is processed through the TCAP block 54" of the invention.

If the SS7 message is an ISUP message, the exchange issuing the ISUP message has already determined where the message packet should go. The routing is done at the lower, Message Transfer Part (MTP) layer, and the STP simply routes the packet to the next point in the SS7 network.

The TCAP block 54" includes the following steps:

Step 431: the directory number DN1 is parsed out from the input message and checked to see if it is an ONS ported number. If it is an ONS ported number, control proceeds to Step 432. Otherwise control proceeds to Step 442 for LNP processing.

Step 432: The directory number DN1 is identified to be a ported number supported in the ONS system, and control proceeds to Step 434.

Step 434: The entry for the directory number DN1 is looked up to obtain the point code (address of the next point in the SS7 network.). The DN1 would have previously been entered into the Global Title Translation (GTT) table in the OSTP. If DN1 is ONS ported, its entry will have a point code pointing to an ONS database, and control proceeds to Step 436.

Step 436: ADN1 entry is found in the GTT and the looked up point code would point to an ONS-SCP database. The control then proceeds to Step 437.

Step 437: The ONS-SCP is looked up by the OSTP using DN1.

Step 438: The address of the exchange LRN3 to which DN1 has ported to is returned. The control proceeds to Step 450.

Step 442: The directory number DN1 is identified to be a ported number supported in the LNP system, and control proceeds to Step 444.

Step 444: The entry for the directory number DN1 is looked up to obtain the point code (address of the next point in the SS7 network.). The DN1 would have previously been entered into the Global Title Translation (GTT) table in the OSTP. If DN1 is LNP ported, its entry will have a point code pointing to an LNP database, and control proceeds to Step 446.

Step 446: A DN1 entry is found in the GTT and the looked up point code would point to a LNP-SCP database. The control then proceeds to Step 446.

Step 447: The LNP-SCP is looked up by the OSTP using DN1.

Step 448: The address of the exchange LRN2 to which DN1 has ported to is returned. The control proceeds to Step 450.

Step 350: The returned LRN is output from the OSTP and returned to the exchange that initiated the query.

Figure 9:
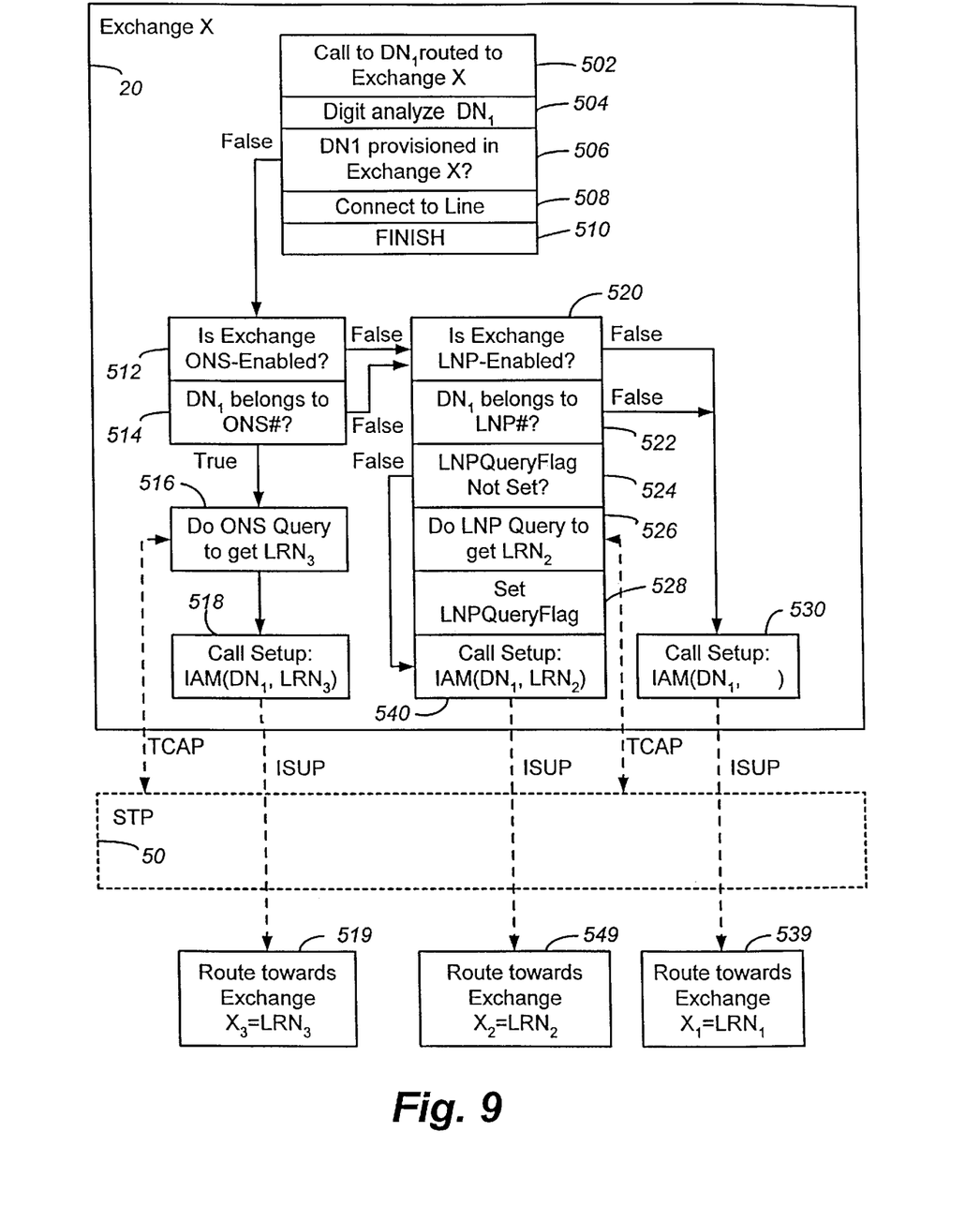

FIG. 9 is a flow diagram illustrating the actions and signalings of an Exchange X 20 and a Signal Transfer Point (STP) 50 when implementing One-Number-Service (ONS) according to another aspect of the present invention.

Step 502: A call to the directory number DN1 is routed to the present Exchange X.

Step 504: A digit analysis is performed on DN1

Step 506: DN1 is checked against a line translation table (LTT) to see if the number is provisioned in Exchange X Control proceeds to Step 508 if it is, otherwise control proceeds to Step 520.

Step 508: Since DN1 is provisioned in Exchange X, connection is made to access line to complete the call.

Step 510: Call connection is completed.

Step 512: Since DN1 is not provisioned in Exchange X, attempt is made to determine which exchange it resides on. First, it is determined if Exchange X is ONS-enabled. If it is, ONS lookup of the LRN (address) of the designation exchange may be possible and control proceeds to Step 514. Otherwise, control proceeds to Step 520 to test if Exchange X is LNP-enabled.

Step 514: Since Exchange X is ONS-enabled, next, DN1 is checked to determined if it is native to an ONS-enabled exchange. If it is, control proceeds to Step 516 for the next step in ONS lookup. Otherwise, DN1 is native to a non-ONS-enabled exchange and control proceeds to Step 520.

Step 516: A TCAP signal is issued to the STP 50 to perform an ONS lookup. The database 80 (see FIG. 4) is looked up using DN1 to retrieve the associated LRN2. The address of the destination exchange is then returned by the STP 50 to the Exchange X 20, and control proceeds to Step 518.

Step 518: The LNPQueryFlag in the IAM is set to prevent further LNP lookups. Control then proceeds to Step 540.

Step 519: The IAM packet is routed by the STP 50 to the next point in the SS7 network and towards the exchange having LRN3.

Step 520: First, it is determined if Exchange X is LNP-enabled. If it is, LNP lookup of the LRN (address) of the designation exchange may be possible and control proceeds to Step 522. Otherwise, control proceeds to Step 530.

Step 522: Since Exchange X is LNP-enabled, next, DN1 is checked to determined if it is native to a LNPenabled exchange. If it is, control proceeds to Step 524 for the next step in LNP lookup. Otherwise, DN1 is native to a non-LNP-enabled exchange and a standard call setup is done in Step 530.

Step 524: Since DN1 has been determined to be in the LNP scheme, a lookup to determine the LRN of the exchange it has ported to is possible. The LNPQueryFlag in the IAM message is checked to see if an LNP lookup has already been made. If the flag is not set, control proceeds to do an LNP lookup in Step 526. Otherwise, LNP lookup has already been done and control proceeds to Step 540.

Step 526: A TCAP signal is issued to the OSTP 50 to perform a LNP lookup. The database 80 (see FIG., 4) is looked up using DN1 to retrieve the associated LRN2. The address of the destination exchange is then returned by the STP 50 to the Exchange X 20, and control proceeds to Step 528.

Step 528: The LNPQueryFlag in the IAM is set to prevent further LNP lookups. Control then proceeds to Step 540.

Step 530: The IAM is one of a standard IAM and is sent as an ISUP signal to the STP 50.

Step 539: The IAM packet is routed by the STP 50 to the next point in the SS7 network and towards the exchange having LRN1.

Step 540: The IAM already contains the LRN of the destination address obtained from a previous LNP lookup, and is sent as an ISUP signal to the STP 50 to be processed by the ISUP processing component 52.

Step 549: The IAM packet is routed by the OSTP 50 to the next point in the SS7 network and towards the exchange having LRN2.

Step 550: After processing by the ISUP processing component 52, the IAM packet is routed from the STP 50 to the next point in the SS7 network.

FIG. 5(e) illustrates the state of the IAM after an ONS query has been performed. The address of the destination exchange LRN3 is returned and entered into the CdPN field.

While the embodiments of the various aspects of the present invention that have been described are the preferred implementation, those skilled in the art will understand that variation thereof may also be possible. Therefore, the invention is entitled to protection within the full scope of the appended claims.

It is claimed:

1. In a telecommunication system having a group of interlinked, addressable exchanges, where a call is routed to a destination exchange therein, the call routing being setup in cooperation with a signaling packet containing an address of the destination exchange passed between exchanges routing the call, a method of porting a subscriber's directory number from a first access point provisioned in a first exchange to a second acces point provisioned in a second exchange among said group of exchanges, comprising:

providing a database for obtaining an address of an exchange provisioning a given directory number, said database being accessible by said group of interlinked, addressable exchanges;

maintaining said database to reflect said subscriber's directory number being provisioned by the second exchange instead of the first exchange; and intercepting a signaling packet associated with a call to said subscriber's directory number, wherein said intercepting results in additional steps, including:

querying said database with said subscriber's directory number to obtain an address for the second exchange; and modifying the address of the destination exchange contained in the intercepted signaling packet by substituting it with that of the second exchange; and passing the modified signaling packet to an exchange among said group of exchanges so that said call to said subscriber's directory number is routed to the second exchange accordingly.

2. A method of porting a subscriber's directory number as in claim 1, wherein:

the first exchange includes one selected from a wireline, wireless, cable network, local-area network or wide-area network telecommunication system.

3. A method of porting a subscriber's directory number as in claim 1, wherein:

the second exchange includes one selected from a wireline, wireless, cable network, local-area network or wide-area network telecommunication system.

4. A method of porting a subscriber's directory number as in claim 1, wherein the first and second exchange are one and the same.

5. A method of porting a subscriber's directory number as in claim 1–4, wherein said database is one of a plurality of databases accessible to said group of interlinked, addressable exchanges.

6. A method of porting a subscriber's directory number as in claim 1-4, further comprising:

providing a signal transfer processor for performing the steps of intercepting a signaling packet, querying said database, and modifying the address of the designation contained in the intercepted signaling packet.

7. A method of porting a subscriber's directory number as in claim 1-4, wherein:

said step of querying said database further including determining if said subscriber's number is a ported number before performing the querying of said database.

8. A method of porting a subscriber's directory number as in claim 1-4, wherein the steps of intercepting a signaling packet, querying said database, and modifying the address of the designation contained in the intercepted signaling packet are performed under an established Integrated Service Digital Network User Part protocol of a predefined signaling system network.

9. In a telecommunication system having a group of interlinked, addressable exchanges serviced by a service provider, where a call is routed to a destination exchange therein, the call routing being set up in cooperation with a signaling packet containing an address of the destination exchange passed between exchanges routing the call, a method of porting a subscriber's directory number from a first access point provisioned in a first exchange to a second access point provisioned in a second exchange among said service provider, comprising:

providing a database for said group of interlinked, addressable exchanges to obtain an address of an exchange provisioning a given directory number;

maintaining said database to reflect said subscriber's directory number being provisioned by the second exchange instead of the first exchange;

causing one of said interlinked addressable exchanges, in response to said subscriber's directory number, to query said database with said subscriber's directory number to obtain an address for the second exchange, said query including determining if said subscriber's number is a ported number before performing the querying of said database;

using the address for the second exchange to construct the signaling packet for the call routing being set up; and passing the signaling packet to another exchange among said group of exchanges so that said call to said subscriber's directory number is routed to the second exchange accordingly.

10. A method of porting a subscriber's directory number as in claim 9, wherein:

the first exchange includes one selected from a wireline, wireless, cable network, local-area network or wide-area network telecommunication system.

11. A method of porting a subscriber's directory number as in claim 9, wherein:

the second exchange includes one selected from a wireline, wireless, cable network, local-area network or wide-area network telecommunication system.

12. A method of porting a subscriber's directory number as in claim 9, wherein the first and second exchange are one and the same.

13. A method of porting a subscriber's directory number as in claim 9-12, wherein said database is one of a plurality of databases accessible to said group of interlinked, addressable exchanges.

14. A method of porting a subscriber's directory number as in claim 9-12, further comprising:

providing a signal transfer processor for performing the steps of querying said database in response to said subscriber's directory number to obtain an address for the second exchange.

15. A method of porting a subscriber's directory number as in claim 14, wherein said signal transfer processor performing the step of querying under an established Transaction Capable Application Part protocol of a predefined signaling system network.

16. In a telecommunication system having a group of interlinked, addressable exchanges, where a call is routed to a destination exchange therein, the call routing being setup in cooperation with a signaling packet containing an address of the destination exchange passed between exchanges routing the call, an improved exchange, comprising:

a first trigger responsive to one of a first set of directory numbers to cause a first query of a first database containing porting information of said one of a first set of directory numbers, said first query returning an address for the second exchange;

a second trigger responsive to another one of a second set of directory numbers to cause a second query of a second database containing porting information of said another one of a second set of directory numbers, said second query returning an address for the second exchange;

means for constructing the signaling packet for the call routing being set up using the address for the second exchange; and means for passing the signaling packet to another exchange among said group of exchanges so that said call to said subscriber's directory number is routed to the second exchange accordingly.

17. An improved exchange as in claim 16, wherein:

the first exchange includes one selected from a wireline, wireless, cable network, local-area network or wide-area network telecommunication system.

18. An improved exchange as in claim 16, wherein:

the second exchange includes one selected from a wireline, wireless, cable network, local-area network or wide-area network telecommunication system.

19. An improved exchange as in claim 16, wherein the first and second exchange are one and the same.

20. An improved exchange as in claim 16, wherein the first set of directory numbers is associated with Local Number Porting (LNP).

* * * * *